US011065549B2

United States Patent
Rico et al.

(10) Patent No.: US 11,065,549 B2
(45) Date of Patent: Jul. 20, 2021

(54) AI MODELING FOR VIDEO GAME COACHING AND MATCHMAKING

(71) Applicant: Sony Interactive Entertainment Inc., Tokyo (JP)

(72) Inventors: Javier Fernandez Rico, San Mateo, CA (US); Michael Taylor, San Mateo, CA (US); Glenn Black, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 62 days.

(21) Appl. No.: 16/355,543

(22) Filed: Mar. 15, 2019

(65) Prior Publication Data
US 2020/0289943 A1    Sep. 17, 2020

(51) Int. Cl.
| A63F 13/00 | (2014.01) |
| A63F 13/798 | (2014.01) |
| A63F 13/67 | (2014.01) |
| G06K 9/62 | (2006.01) |
| G06N 3/08 | (2006.01) |

(52) U.S. Cl.
CPC ............ *A63F 13/798* (2014.09); *A63F 13/67* (2014.09); *G06K 9/6256* (2013.01); *G06K 9/6267* (2013.01); *G06N 3/08* (2013.01)

(58) Field of Classification Search
None
See application file for complete search history.

(56) References Cited

U.S. PATENT DOCUMENTS

| 2002/0028704 | A1* | 3/2002 | Bloomfield | G06Q 30/02 463/1 |
| 2006/0246973 | A1* | 11/2006 | Thomas | A63F 13/42 463/4 |
| 2015/0217449 | A1* | 8/2015 | Meier | B25J 9/1602 700/257 |
| 2017/0061817 | A1* | 3/2017 | Mettler May | A61B 5/7405 |

(Continued)

FOREIGN PATENT DOCUMENTS

WO    2018004839 A1    1/2018

OTHER PUBLICATIONS

Bogdanovic, Miroslav, et al.: Deep Apprenticeship Learning for Playing Video Games, dated Apr. 1, 2015, XP055707547, retrieved from the Internet: URL:http://www.cs.ox.ac.uldpeople/nando.de frietas/publications/apprenticeship.pdf [retrieved on Jun. 22, 2020].

(Continued)

*Primary Examiner* — Paul A D'Agostino
(74) *Attorney, Agent, or Firm* — Penilla IP, APC

(57) ABSTRACT

A method is provided, including the following operations: recording gameplay data from a first session of a video game, the first session defined for interactive gameplay of a user; training a machine learning model using the gameplay data, wherein the training causes the machine learning model to imitate the interactive gameplay of the user; after the training, determining a classification of the machine learning model by exposing the machine learning model to one or more scenarios of the video game, and evaluating actions of the machine learning model in response to the one or more scenarios; using the classification of the machine learning model to assign the user to a second session of the video game.

17 Claims, 9 Drawing Sheets

(56) References Cited

U.S. PATENT DOCUMENTS

| | | | | |
|---|---|---|---|---|
| 2017/0213132 | A1* | 7/2017 | Hammond | G06N 3/008 |
| 2017/0304707 | A1* | 10/2017 | Morton | G09B 7/00 |
| 2017/0368413 | A1* | 12/2017 | Shavit | G06K 9/00342 |
| 2018/0018590 | A1* | 1/2018 | Szeto | G06F 21/6254 |
| 2018/0053114 | A1* | 2/2018 | Adjaoute | G06Q 20/4016 |
| 2018/0060301 | A1* | 3/2018 | Li | G06N 3/08 |
| 2018/0096244 | A1* | 4/2018 | Mallinson | G06T 19/006 |
| 2018/0121766 | A1* | 5/2018 | McCord | G06K 9/6297 |
| 2018/0243656 | A1* | 8/2018 | Aghdaie | A63F 13/67 |
| 2018/0264347 | A1* | 9/2018 | Tran | A42B 3/0433 |
| 2018/0300897 | A1* | 10/2018 | Woods | G06F 3/012 |
| 2018/0367484 | A1* | 12/2018 | Rodriguez | H04L 51/02 |
| 2018/0374383 | A1* | 12/2018 | Thielen | A63B 71/0622 |
| 2019/0070572 | A1 | 3/2019 | Fuller et al. | |
| 2019/0354759 | A1 | 11/2019 | Somers et al. | |

OTHER PUBLICATIONS

PCT International Search Report and Written Opinion of the International Searching Authority issued in corresponding International Patent Application No. PCT/US2020/020706 dated Jul. 3, 2020 (PCT Forms ISA 220, 210, 237) (18 total pages).

* cited by examiner

AI MODELING FOR VIDEO GAME COACHING AND MATCHMAKING

BACKGROUND

Field of the Disclosure

The present disclosure relates to systems and methods for AI modeling of a video game user for coaching and matchmaking.

Description of the Related Art

A current area of rapidly growing technology is the field of video gaming, now encompassing a multitude of gaming and interactive application platforms, including dedicated gaming consoles, personal computers (PC), and more recently, cloud application/gaming and mobile devices. One example of a networked gaming service/system is the PlayStation® Network, which includes various gaming services supporting both console-based and cloud-based gaming.

It is within this context that embodiments of the disclosure arise.

SUMMARY OF THE DISCLOSURE

Implementations of the present disclosure provide methods and systems for AI modeling of a video game user for coaching and matchmaking.

In some implementations, a method is provided, including the following operations: recording gameplay data from a first session of a video game, the first session defined for interactive gameplay of a user; training a machine learning model using the gameplay data, wherein the training causes the machine learning model to imitate the interactive gameplay of the user; after the training, determining a classification of the machine learning model by exposing the machine learning model to one or more scenarios of the video game, and evaluating actions of the machine learning model in response to the one or more scenarios; using the classification of the machine learning model to assign the user to a second session of the video game.

In some implementations, the gameplay data includes video of the first session and user inputs during the interactive gameplay.

In some implementations, training the machine learning model uses the video and the user inputs to cause the machine learning model to respond to a given portion of the video by generating inputs similar to the user inputs that were generated in response to the given portion of the video during the first session.

In some implementations, the given portion of the video is defined by one or more image frames of the video.

In some implementations, the user inputs are defined from a controller device operated by the user during the first session.

In some implementations, the machine learning model is a neural network.

In some implementations, the one or more scenarios of the video game are defined by one or more image frames of the video game, that are not defined from the first session.

In some implementations, the gameplay data includes game state data from the first session of the video game.

In some implementations, the classification identifies a level of skill of the user; and, wherein using the classification to assign the user to the second session includes, identifying levels of skill of one or more other users, and configuring the second session to include one or more of the other users having levels of skill that are similar to the level of skill of the user.

In some implementations, the classification identifies a skillset of the user; and wherein using the classification to assign the user to the second session includes, identifying skillsets of one or more other users, and configuring the second session to include one or more of the other users having skillsets that are complementary to the skillset of the user.

In some implementations, assigning the user to the second session of the video game includes, inserting an AI bot into the second session, the AI bot using the trained machine learning model to perform gameplay in the second session.

In some implementations, a method is provided, including the following operations: recording gameplay data from user sessions of a video game, the user sessions defined for interactive gameplay of the video game by a user; using the gameplay data to train a machine learning model to mimic tendencies of the user in the interactive gameplay; after the training, performing an evaluation of the trained machine learning model by exposing the trained machine learning model to predefined scenarios of the video game, and analyzing responses to the predefined scenarios by the trained machine learning model; using the evaluation of the machine learning model to assign the user to a new session of the video game.

In some implementations, the gameplay data includes video and user inputs from the user sessions of the video game.

In some implementations, the tendencies of the user in the interactive gameplay are defined by activity and non-activity of the user in the interactive gameplay.

In some implementations, performing the evaluation of the trained machine learning model is configured to determine a skill level of the user, and wherein assigning the user to the new session is based on the determined skill level of the user.

In some implementations, performing the evaluation of the trained machine learning model is configured to determine a skill set of the user, and wherein assigning the user to the new session is based on the determined skill set of the user.

In some implementations, the machine learning model is a neural network.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

Broadly speaking, implementations of the present disclosure are drawn to methods and systems for using a machine learning model to learn how a player plays a video game, including their individual styles, expressions, tendencies, preferences, etc. Once the machine learning model has been trained, it can be used for various kinds of game interactions, including AI bot insertion, player coaching, and player matchmaking, in accordance with various implementations of the disclosure.

Figure 1:
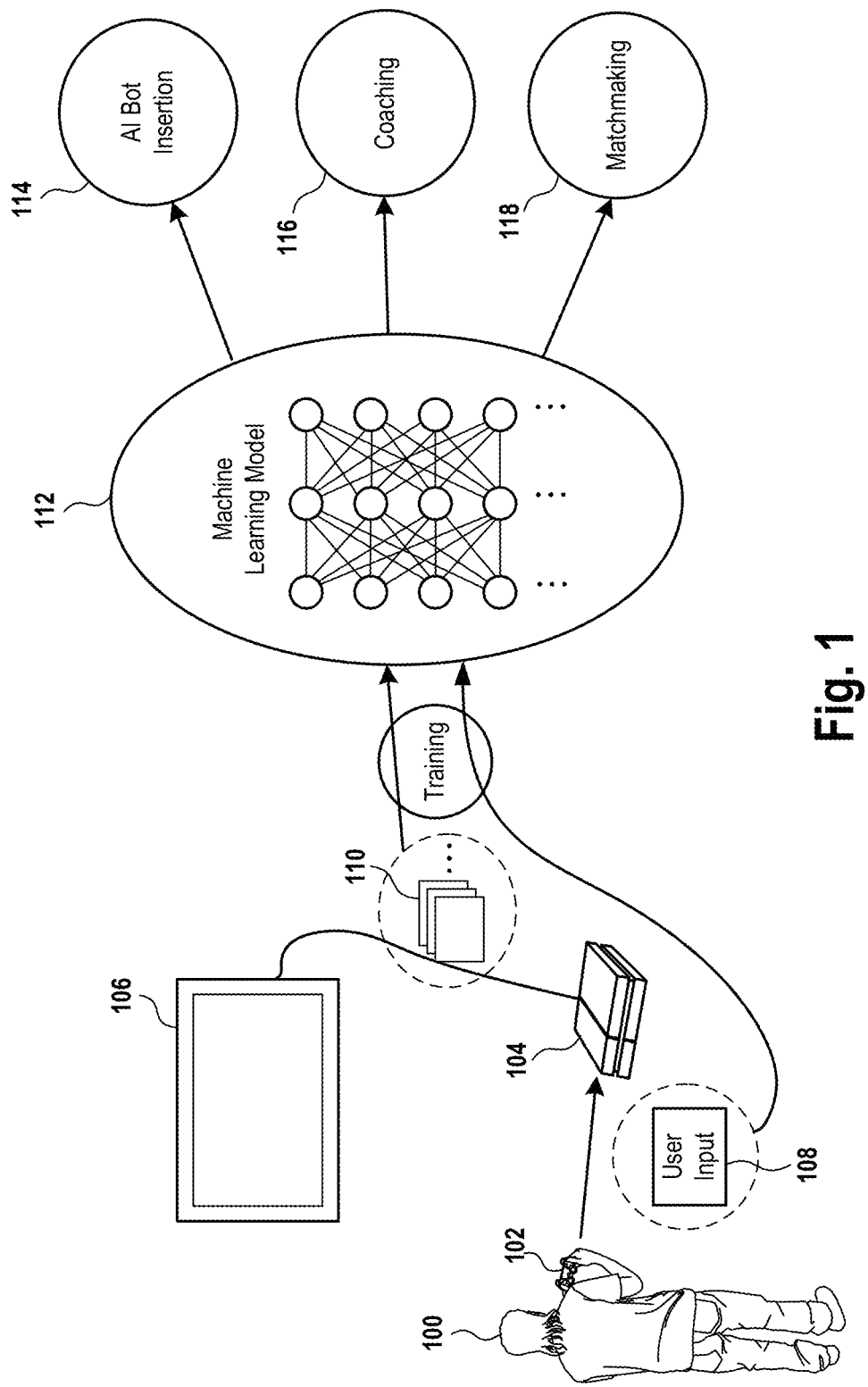
FIG. 1 conceptually illustrates a method for training a machine learning model and using the trained machine learning model for various gaming-related interactions, in accordance with implementations of the disclosure.

FIG. 1 conceptually illustrates a method for training a machine learning model and using the trained machine learning model for various gaming-related interactions, in accordance with implementations of the disclosure. In the illustrated implementation, a user 100 plays a video game that is rendered on a display device 106 by a computing device 104 which executes the video game. As the user 100 plays the video game, the user 100 may operate a controller device 102 so as to supply user input 108 to the computing device 104. The executing video game at the computing device 104 receives the user input 108, and processes the user input in order to update a game state. The updated game state is used to render video 110 (including image frames and audio) for presentation on the display device 106.

It will be appreciated that the hardware utilized for the video game experience can very in various implementations. For example, the computing device can be a game console, personal computer, laptop, tablet, cell phone, or any other type of computing device that is capable of executing a video game as described herein. In some implementations, the video game is a cloud executed video game, meaning that the video game is executed by a cloud gaming server or cloud computing resource, which can be a virtualized computing resource in some implementations, and the gameplay is streamed over a network (including the Internet) to the display device 106. In still other implementations, the functionality of computing device 104 can be integrated into the display device 106. Further by way of example, the display device 106 in various implementations can be a television, LCD display, monitor, mobile device screen such as a tablet screen or cell phone screen, projector, etc. In some implementations, the display device 106 is a head-mounted display. Additionally, the controller device 102 can in various implementations be a gaming controller, motion controller, keyboard, mouse, trackball, touch sensitive trackpad, image capture device, microphone, etc.

In accordance with implementations of the disclosure, a machine learning model 112 (or artificial intelligence model) is trained to imitate the gameplay of the user 100. That is, the machine learning model 112 is trained in a manner so that the machine learning model 112, if presented with a given game scenario, will be configured to perform gameplay actions in response to the game scenario that are substantially similar to those that would be performed by the user 100, or in accordance with the user's gameplay technique, skill, style, tendencies, decision-making, preferences, communications, movements, etc.

It will be appreciated that in order to accomplish this, data that is indicative of what the user experiences (e.g. what the user sees, hears, feels, or otherwise is responding or reacting to during the gameplay) along with data that is indicative of the users gameplay actions (what the user does or decides in response to what they experience during the gameplay), can be utilized to train the machine learning model. In a sense, the user can be viewed as an agent that receives inputs in the form of what they experience during the video game, and provides outputs in the form of their specific gameplay actions which are in response to what they experience. Accordingly, the goal of training the machine learning model 112 is to configure the machine learning model 112 so that it will provide the same outputs that the user would provide when presented with the same inputs.

In some implementations, the machine learning model 112 is trained using the video 110 from a session of the video game, and the user input 108 from the session. It will be appreciated that in some implementations, the video 110 and the user input 108 recorded first, and later the recorded data utilized to train the machine learning model 112. In other implementations, the video and the user input are utilized to train the machine learning model substantially simultaneously with the live gameplay of the video game, or in substantial real-time. It will be appreciated that the training of the machine learning model 112 can be performed by the computing device 104, or by another device such as a remote server or cloud gaming system. In this regard, in some implementations, the video and user input are recorded by the computing device 104, and then uploaded to a cloud system, which receives the video and user input and applies them to train the machine learning model.

In some implementations, the machine learning model is more specifically trained using the image frames from the video 110. In some implementations, the user input 108 is defined by controller inputs from the controller device 102, such as button presses, joystick movements, captured motion of the controller device itself, etc. Broadly speaking, the goal of the training is so that the machine learning model 112 will imitate the actions of the user 100 on a decision by decision basis. In implementations using image frames as presently described, then each frame of the video can be considered to be a scenario to which the user reacts, by generating controller inputs such as button presses, etc., or by doing nothing. Each frame thus presents a decision point for the user, and the machine learning model is trained to imitate the user's decisions/actions (including doing nothing) on a frame by frame basis. Ideally, the trained machine learning model is configured to generate the same response, in terms of controller inputs or lack thereof, that the user generates in response to a given image frame or sequence of image frames.

While the foregoing is described with reference to controller inputs as user inputs, it will be appreciated that the principles also apply to any other type of user inputs, such as user motion or gesture input, captured head-mounted display movements, speech input, etc. It will be appreciated that regardless of the kinds of user inputs that are captured and applied, the goal of the machine learning model training is to configure the machine learning model so that it will reproduce the same or similar inputs in response to a given image frame or sequence of image frames.

Furthermore, in addition to image frames as described above, additional information can be utilized for purposes of providing training data to the machine learning model 112. For example, audio from the gameplay (which may be included as part of video 110) may also be used, as it is another aspect of the gameplay that is experienced by the user 100 during a gaming session. Furthermore, haptic feedback information can also be used in some implementations as part of the training data.

The frame by frame approach described above can be useful for enabling a machine learning model 112 to imitate the user 100 in video games such as first person shooter video games. For in a first person shooter video game, the user is effectively making decisions at every frame, as changes from frame-to-frame indicate the changing state of the video game and can affect the outcome of the game, and the user may react on a frame-by-frame basis. However, in other types of video games, it may not be necessary to train the machine learning model on a frame-by-frame basis, as the video game may not change on a frame-by-frame basis in a manner that is significant towards determining the outcome of the video game.

For example, in turn-based video games, players make take turns issuing commands. And thus, decision making is not occurring on a frame-by-frame basis, but rather at each turn taken by each given player. The state of the video game does not change until a player makes an input, and so for purposes of training a machine learning model 112, it is not necessary to train on a frame-by-frame basis. Rather, data indicating the experience available to the user, for example at each turn in which the user has the opportunity to perform an action, can be used to train the machine learning model 112. It will be appreciated that the user input is also utilized for training purposes, in the same way as previously described. That is, the machine learning model 112 is trained to produce the same or similar input as the user input when presented with a given set of data indicating the experience available to the user during gameplay.

In some implementations, the data indicating or identifying the experience of the user during gameplay may in fact be one or more image frames which are captured from specific decision points occurring during the session of the video game. However, it will be appreciated that not all image frames rendered during the gameplay session are used, but rather a subset that are sufficient to adequately identify the user's experience or the data available to the user during gameplay, and to which the user responded by providing the user input.

In some implementations, the data indicating or identifying the experience of the user during gameplay can include game state data, including by way of example without limitation, positions of objects or characters in a virtual environment, properties of objects or characters (e.g. inventories, health, skills, etc.), or the states of any other variables or entities that may affect the gameplay. Furthermore, it will be appreciated that while user input has generally been described with reference to controller input specifically, other kinds of data including certain types of game state data can be used, for purposes of training the machine learning model, to define the user's actions in response to what they experience during gameplay.

Once trained, the machine learning model 112 is configured to imitate the gameplay style and tendencies of the user 100. This can be used for various purposes such as AI bot insertion (ref. 114), coaching (ref. 116), and matchmaking (ref. 118), as discussed in further detail below.

Broadly speaking, the goal of training the machine learning model 112 can be considered to be a supervised learning task. In some implementations, the machine learning model 112 is specifically an artificial neural network (e.g. a multilayer perceptron). In other implementations, the machine learning model 112 can utilize other types of artificial intelligence or machine learning techniques (e.g. support vector machine, linear regression, logistic regression, naive Bayes, decision trees, k nearest neighbor, etc.) that can be configured to imitate the gameplay of a user, in accordance with implementations of the present disclosure.

Figure 2:
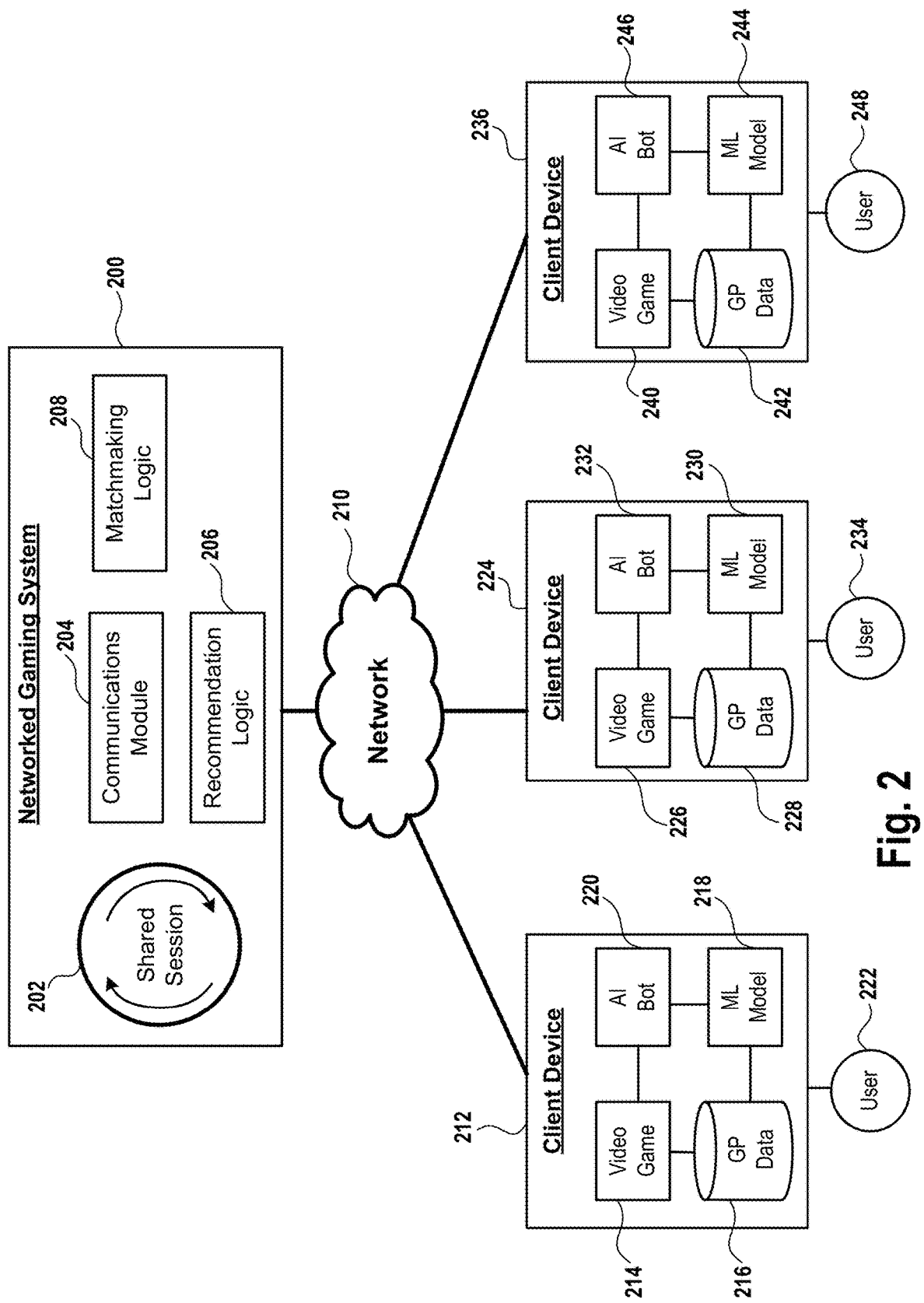
FIG. 2 conceptually illustrates a system for training and using a machine learning model in various video game related contexts, in accordance with implementations of the disclosure.

FIG. 2 conceptually illustrates a system for training and using a machine learning model in various video game related contexts, in accordance with implementations of the disclosure. In the illustrated implementation, A client device 212 is connected to a network 210, and communicates over the network 210 with a networked gaming system 200. The client device 212 is a computing device capable of executing a video game 214, such as a game console or personal computer in some Implementations.

As has been discussed, when a user 222 plays the video game 214, gameplay data 216 is generated, which can be used to train a machine learning model 200 to learn and imitate the user's 222 gameplay style and tendencies. In the illustrated implementation, client devices 224 and 236 are similarly configured to client device 212. For example, client device 224 can execute a video game 226 for gameplay by a user 234, and the resulting gameplay data 228 is used to train a machine learning model 230 to imitate the gameplay of user 234. Similarly, client device 236 can execute a video game 240 for gameplay by a user 248, and the generated gameplay data 242 can be used to train a machine learning model 244 to imitate the gameplay of user 248.

In some implementations, the trained machine learning models corresponding to the various users can be used to enable gameplay of the video game by AI bots that are representative of the users. For example, in some implementations the video game supports online multiplayer gaming, using the networked gaming system 200. Networked gaming system 200 may execute a shared session 202 of the video game, and each of the client devices 212, 224, and 236 connects to the shared session 202 over the network 210. In a conventional multiplayer video game, each user is tasked with controlling their respective character or entity in the multiplayer session. However, in accordance with implementations of the present disclosure, instead of a given user, an AI bot corresponding to that user can be deployed to play the game on their behalf.

For example, in the illustrated implementation, an AI bot 220 that corresponds to user 222 can use the trained machine learning model 218 to participate in the shared session 202 of the video game. The AI bot 220 is an agent configure to perform gameplay of the video game on behalf of the user 222. It will be appreciated that the AI bot 220 will perform gameplay of the video game in a manner that is similar to the way which user 222 would play the video game, as it is using the trained machine learning model 218 which has learned the user's play style. Similarly, an AI bot 232 can be configured to participate in the shared session 202 of the video game using machine learning model 230 which has learned the game play tendencies of the user 234. And an AI bot 246 can participate in the shared session on behalf of the user 248, using the trained machine learning model 244 so as to imitate the gameplay style of the user 248.

By enabling trained AI bots to play on behalf of users, new kinds of interactive experiences become possible. For example, in some implementations, users can play against each other's AI bots. In this way, a user may be able to know what it is like to play against another user, even when that user is not available or otherwise not participating in the video game. In some implementations, users can have their AI bots play against each other. In some implementations, a user may watch their own AI bot play a video game. This can be entertaining by allowing a user to effectively see how they play in a real-time setting, but from a third-person observer perspective. This may further prove educational as a user may learn from effectively watching themself play in real-time through spectating their AI bot's gameplay.

For example, user 222 and user 234 may wish to play a video game with user 248, e.g. as part of a team together or against each other. However user 248 might not be online at the same time that user 222 and user 234 are available. Normally, the non-availability of user 248 would prevent the collective experience from happening. However, while user 248 is not available, user 248's AI bot 246 is available and can play the video game in place of user 248. This way, users 222 and 234 are not prevented from their desired group play experience, and the gameplay contribution from AI bot 246 will be similar to that which would have been provided by user 248 had user 248 been online and available to play. Thus, the use of AI bots allows for simulated multi-player gameplay without full human presence.

In the illustrated implementation, the networked gaming system 200 further includes a communications module 204 that is configured to facilitate communication between users of the system. By way of example, such communications can include messaging, chat, audio, video, text, email, comments, replies, etc. It will be appreciated that such communication can facilitate insertion of AI Bots in video games as presently described. For example, one user may message another user or send an invitation to another user to join a multiplayer video game. In response, the system may respond with a message indicating that the other user is not available, but their AI bot is available for gameplay, and providing an option to the sending user to play with or against the AI bot.

In further implementations, the video game can be configured to provide a feature whereby a user may use another player's AI bot to perform gameplay of a chosen scene or portion of the video game. This can be useful for helping a user to overcome a difficult section of the game. For example the user may be at a certain skill level, but may request a more advanced player's AI bot to play a difficult section of the video game so that they can watch how the more advanced player would play and overcome the difficult section of video game. In this way, the less advanced player can learn from the gameplay of a more advanced player, without the more advanced player actually being required to engage in demonstrative real-time gameplay. It will be appreciated that this allows the less-experienced player to watch a more experienced player handle a specific section of the video game that they are interested in or having difficulty overcoming, without having to resort to other more time-consuming methods for learning a specific portion, such as searching online for gameplay videos that cover the specific portion of the video game.

Additionally, it will be appreciated that the video game can be configured so that when another player's AI bot is playing the video game, then any achievements are not credited to the original host user's account. Thus, the game play by another player's AI bot can be viewed or spectated by the host user, but will not affect the host user's position or advancement within the context of the video game's storyline or objectives. In this sense, the game play by the other players AI bot is gameplay for which a save point is not recorded, either during or at the completion of such gameplay.

However, in other implementations, a user may be able to borrow another user's AI bot to play for them intentionally, wherein the accomplishments or achievements during such gameplay are saved and credited to the original user's account. In a sense, this is similar to having a friend play for oneself or on one's behalf, without requiring the friend to actually perform the gameplay. In some implementations, users may pay for usage of other players' AI bots, for example using a virtual currency, digital assets, digital credits, an actual currency, etc. Thus, a market can be created in which users are able to train and improve their AI bots through regular gameplay and advancement in the video game, and then rent out their trained AI bots to other users. In some implementations, AI bots can be rented on a per unit time basis or some other measure quantifying the usage of the AI bot, such that the amount paid for rental of the AI bot will depend upon the amount that the AI bot was actually used. In such an ecosystem, usage statistics for a given AI bot can be posted and made available, and users may leave comments relating to a given AI bot after using the AI bot.

With continued reference to FIG. 2, the networked gaming system 200 further includes recommendation logic 206 which is configured to provide recommendations to the users based on their trained machine learning models, as discussed further below. Also, the networked gaming system 200 additionally includes matchmaking logic 208, which is configured to perform matchmaking activities in relation to video games, as further discussed below.

Additionally, it is noted that in some implementations, any of the functionality that has been described as being performed by the client devices, can be performed by the networked gaming system 200. For example, in a cloud gaming setup, the execution of the video game can be performed by the networked gaming system 200, with the client devices configured to stream gameplay from the networked gaming system over the network 210. Furthermore, the storage of gameplay data, training of the machine learning models, and implementation of the AI bots can be performed by the networked gaming system 200 in some implementations.

Figure 3:
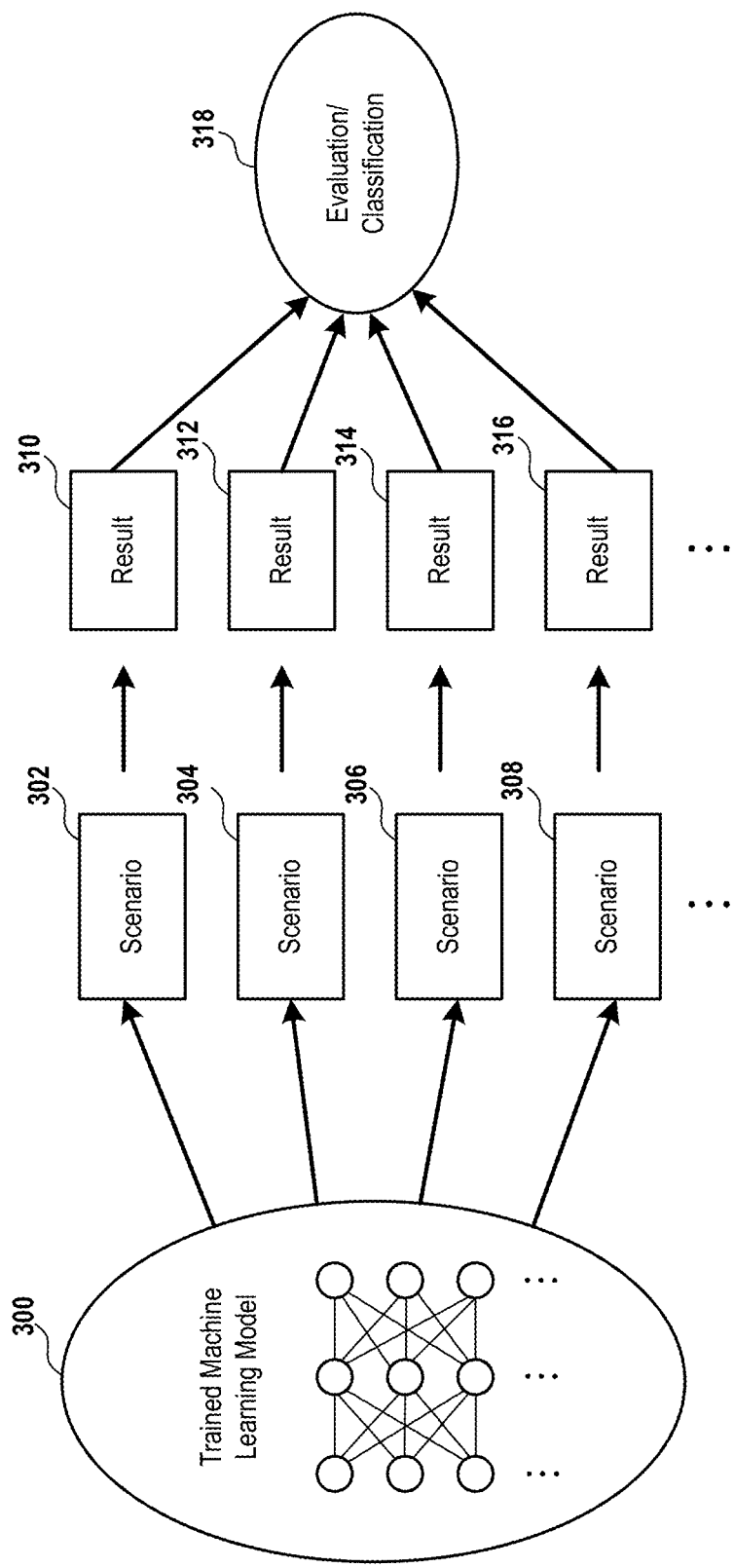
FIG. 3 conceptually illustrates a process for evaluating or classifying a trained machine learning model that mimics a player's gameplay behavior, in accordance with implementations of the disclosure.

FIG. 3 conceptually illustrates a process for evaluating or classifying a trained machine learning model that mimics a player's gameplay behavior, in accordance with implementations of the disclosure. As has been discussed, a machine learning model can be trained for imitation learning, wherein the machine learning model learns to imitate a user's gameplay, so that if presented with the same type of scenario, it will make moves similar to the user. One advantage of training a machine learning model to imitate the gameplay behavior of a user is that in order to evaluate the gameplay of a user, it is not necessary to observe the actual user or their actual gameplay. Instead, the machine learning model can be trained to mimic the user's tendencies, and then presented with different scenarios, enabling the gameplay behavior of the user to be evaluated. This technique is a powerful and precise method for classifying a user's gameplay behavior, as it does not rely upon extrapolation from previous accomplishments or achievements, but instead enables a direct performance evaluation on a specific scenario to be carried out, with the results providing a direct performance indication. Thus the answer to the question of how a given user would perform in a given scenario is not theoretical or extrapolated, but based on direct testing of the user's AI bot against the actual scenario.

In the illustrated implementation, the trained machine learning model 300 is applied to various scenarios 302, 304, 306, and 308. Each of these scenarios can be a given game situation, and includes data of the type that was used to train the machine learning model 300 as indicative of gaming scenarios experienced by the user. For example, in accordance with implementations described above wherein the training data included image frames from captured video of the user's gameplay, each scenario can include an image frame or a sequence of image frames in some implementations, with the image frames defining a particular video game scene. In some implementations, such an image frame can be a screenshot from the video game. In other implementations, each scenario can be defined by other kinds of data that would define the experience of the user if such a scenario were presented to the user.

The application of the machine learning model 302 the scenarios 302, 304, 306, and 308 produces corresponding results 310, 312, 314, and 316, respectively. In some implementations, each result is defined by the data that his produced by the machine learning model 300 in response to the scenario. For example, the results can include controller inputs that are produced by the machine learning model in response to the scenario. It should be appreciated that the result can also be defined by the lack of a responsive action by the machine learning model in response to the scenario.

At reference 318, an evaluation or classification operation is performed based on the results. For example, in some implementations this can include determinations of weather the controller inputs produced by the machine learning model in response to the scenario match a predefined set of controller inputs, which can also include considerations of the order and timing of such controller inputs. In some implementations the evaluation can include assignment of a level of skill to the machine learning model or to the corresponding user of the machine learning model 300. In various implementations, the evaluation can include determination of various skills, experience, proficiency, character types, styles, tendencies, deficiencies, or any other property or classification which can be attributed to the user or the machine learning model based on the results of the exposure to the various scenarios, and which can be used for downstream game-related activities such as providing recommendations/coaching, matchmaking, etc.

Thus, a trained AI/machine learning model can be evaluated by presenting it with different scenarios, and then classifying it based on how it reacts. In some implementations, this can be performed as an offline process, separate from an online training process. The system, such as the networked gaming system described above, can present the trained machine learning model with various scenarios, record what it does, then classify it for various activities such as matchmaking, coop activities, coaching, etc.

In some implementations, a scenario may be defined by an executing portion of a video game, for example loaded to a specific scene of the video game. A user's machine learning model (or the user's AI bot) can be applied to play the portion of the video game, and the outcome of the gameplay can be used to classify the machine learning model. It will be appreciated that various video game specific outcomes can enable classification of the user's machine learning model, such as whether the model survives the scenario, takes one or more actions, reaches a goal, attains an achievement, achieves something in a given amount of time, etc.

Figure 4:
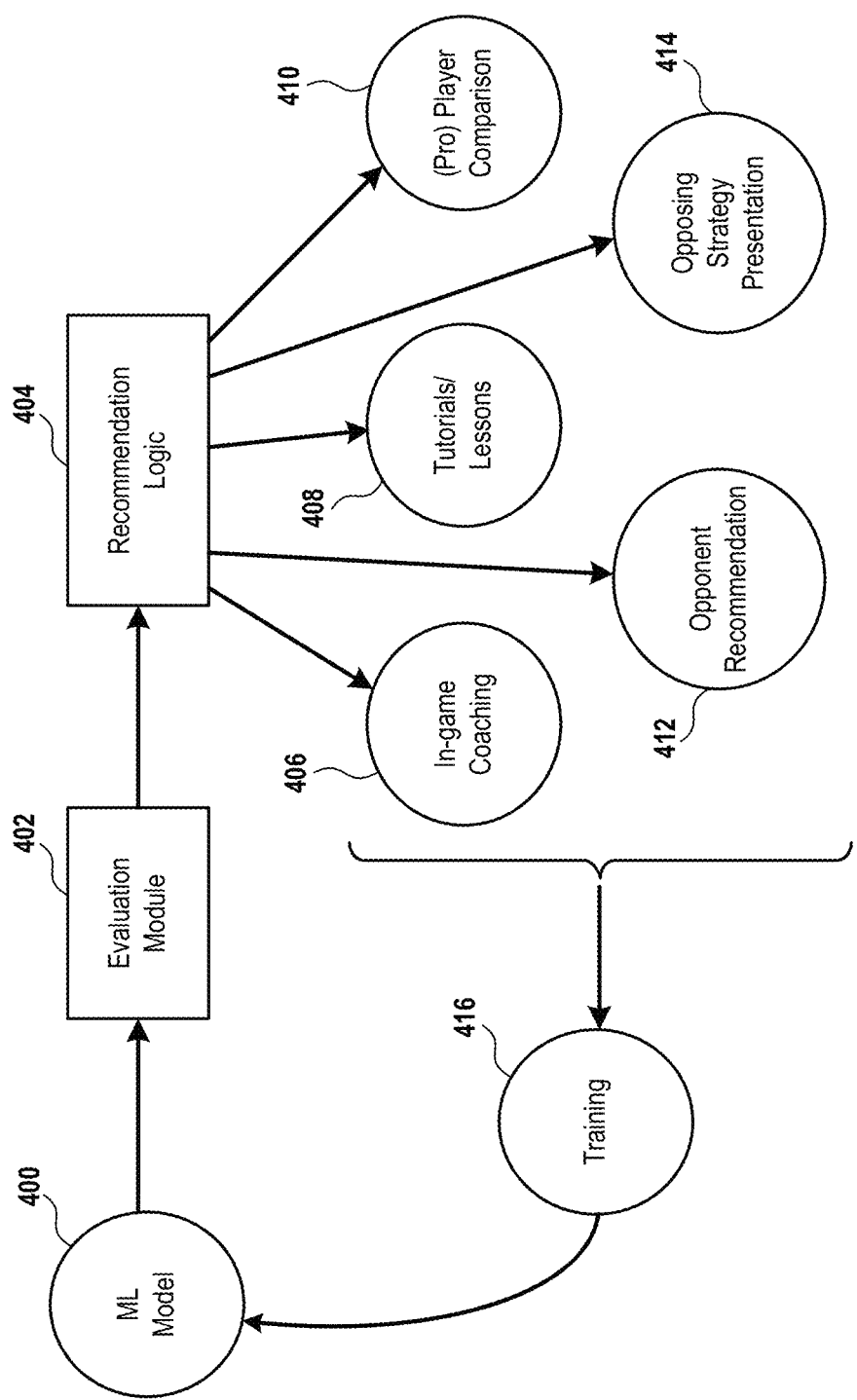
FIG. 4 illustrates a system for providing recommendations to a user based on their trained machine learning model, in accordance with implementations of the disclosure.

FIG. 4 illustrates a system for providing recommendations to a user based on their trained machine learning model, in accordance with implementations of the disclosure. As shown, a trained machine learning model 400 can be evaluated or classified by an evaluation/classification module 402, which can be configured to perform evaluation of the machine learning model 400 in accordance with principles described above, including presenting the machine learning model with various scenarios and evaluating the results. A recommendation logic 404 is configured to provide recommendations to the user based on the results of the evaluation of the machine learning model. It will be appreciated that in such implementations as presently described, the evaluation is configured to provide information or classifications which are useful towards making recommendations to the user as described further below.

In some implementations, the system is configured to recommend specific coaching to a player based on the evaluation/classification of their machine learning model, so as to help the player develop and improve their game play skill set. That is, the evaluation can be configured to identify areas of the user's gameplay for improvement, such as certain skills or techniques. In some implementations the recommendation logic 404 may provide in-game coaching 406, which provides tips or hints or other helpful information to the player during gameplay of the video game. It will be appreciated that these coaching tips are specific to the user as they are determined or chosen based on the specific user's evaluation of their trained machine learning model. In some implementations, the recommendation logic 404 may recommend tutorials or lessons 408 to the user, which generally occur outside of the context of the actual gameplay of the video game. By way of example without limitation, such tutorials or lessons can entail rendering of a practice environment in which the user is able to receive instruction and practice certain skills.

In some implementations, the recommendation logic 404 can provide a player comparison 410, for example comparing the user to various professional players, and providing an indication of which professional player is similar in style. Thus the recommendation logic 404 may recommend the style of the professional player to the user, and perhaps suggest tips for developing a style similar to that of the specific professional player. The recommendation logic 404 can recommend certain paths of learning in this regard.

In some implementations, the recommendation logic 404 can provide opponent recommendations 412, suggesting opponents for the user to play against so as to help the user improve their gameplay. In a related implementation, the recommendation logic 404 can provide an opposing strategy presentation for 14, for example identifying strategies that are effective against the user, and encouraging the user to adapt to those strategies, such as by presenting the user with opponents that effectively employ such strategies in their models.

It will be appreciated that as a result of the coaching recommendations provided by the recommendation logic 404, new training data may be generated for training the machine learning model 400, has indicated at reference 416. Thus the machine learning model 400 will change overtime as the user receives coaching and implements the suggestions and strategies provided through the coaching.

It is noted that the evaluation module 402 and the recommendation logic 404 can be incorporated in a networked gaming system or various client devices In accordance with the above-described implementations.

Figure 5:
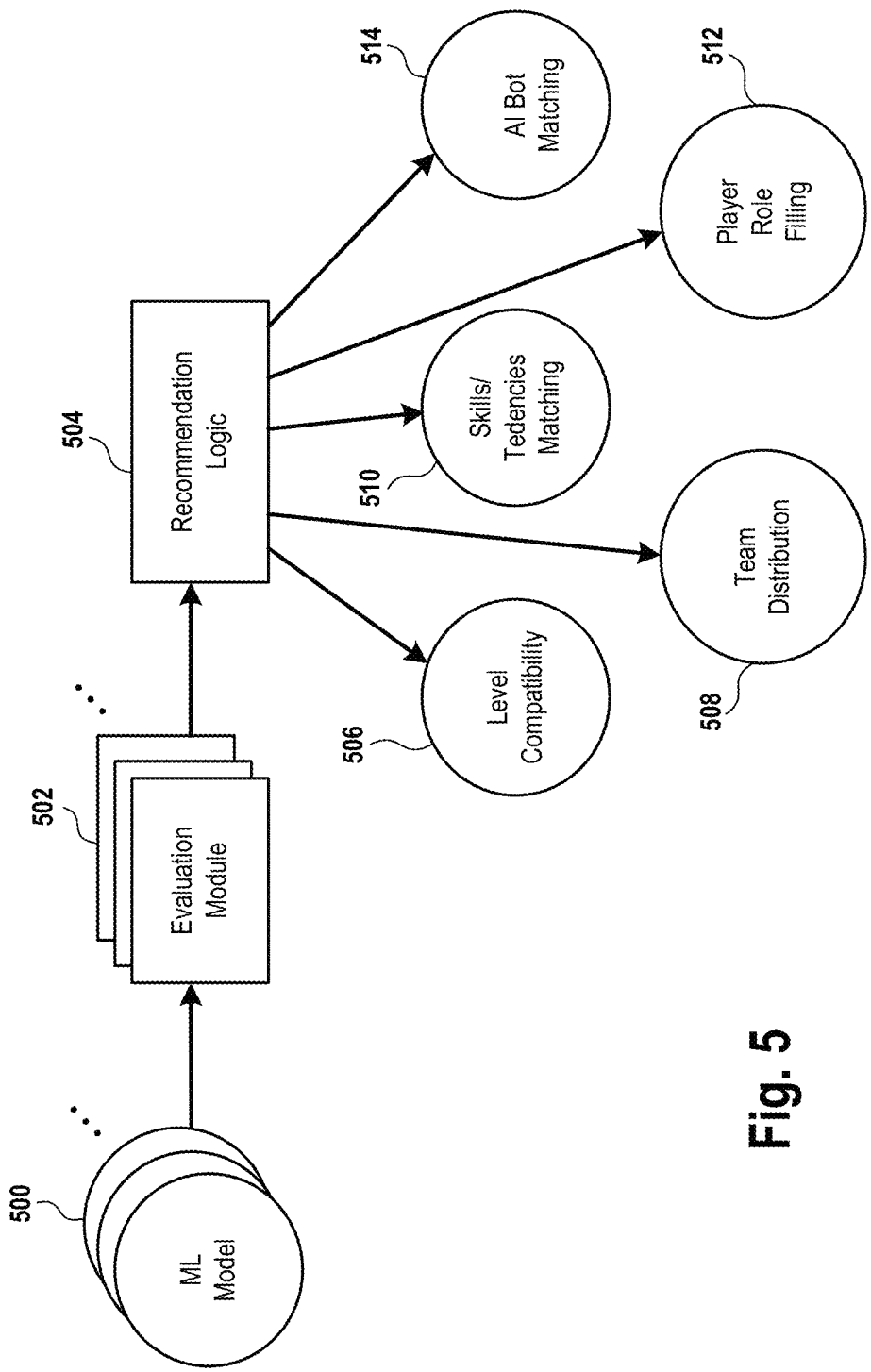
FIG. 5 conceptually illustrates a system for using trained machine learning models to provide improved matchmaking for a video game, in accordance with implementations of the disclosure.

FIG. 5 conceptually illustrates a system for using trained machine learning models to provide improved matchmaking for a video game, in accordance with implementations of the disclosure. In the illustrated implementation, various trained machine learning models 500 corresponding to respective users, are evaluated as has been described, by presenting the machine learning models with one or more scenarios and processing the results. The results of this evaluation can consist of classifications 502 corresponding to each of the machine learning models 500. In the present implementation, these classifications are useful towards performing matchmaking functions in a video game as described further below.

In the illustrated implementation, matchmaking logic 504 is configured to perform matchmaking for a video game. Broadly speaking, matchmaking encompasses functions relating to the assignment or placement of users in a multiplayer video game. For example, there may be many sessions of a given multiplayer video game, and it is desirable to have players of approximately similar skill levels in a given session of the game, so that the game will be competitive. Thus, in some implementations, the classification of the machine learning models is configured to identify skill levels of the corresponding players, and the matchmaking logic 504 is configured to perform matchmaking for level compatibility, as indicated at reference 506. That is, the matchmaking logic 504 will assign players of approximately similar skill levels to the same session of the video game, and will avoid assigning players of disparate skill levels to the same session.

In some implementations, for purposes of joining one of several existing gaming sessions, the matchmaking logic 504 may identify the skill level of the user that wishes to join, and assign that user to a session based on the user's level compatibility with existing users in the session. That is, the matchmaking logic will find a session in which the existing players in that session have skill levels similar to that of the new user, and assign the new user to that session. In some implementations, if a user wishes to join a specific game session that is already in progress, or for which several other users have already been assigned, the matchmaking logic 504 can identify the skill levels of the players in the given session, and also the skill level of the player that wishes to join, And can be configured to notify the user if there is a significant difference in their skill levels/compatibility.

It will be appreciated that because a trained machine learning model is available for evaluation, the skill level of a given user can be classified with a high degree of specificity. For example, some video games may have different kinds of realms, settings, environments, etc. and the skill level of a given player may differ across these different environments. For example, a player may be better at gameplay in a forest type environment versus a city type environment, and thus their skill level is different depending on the environment. This can be evaluated by exposing the player's trained model to forest type environments and city type environments and tracking the outcomes. Such environmentally dependent skill levels can be factored into the level compatibility matchmaking presently described, in that users can be evaluated for the specific environments of specific sessions of the video game, and assigned accordingly based on their skill level that is specific to the particular environment of a given session.

In some implementations the matchmaking logic 504 is configured to distribute players onto different teams based on evaluations/classifications of the players' machine learning models, as indicated at reference 508. For example, the skill levels of players can be determined as described above, and then utilized to distribute the players onto different teams in a manner that provides for evenly matched teams.

In some implementations, the matchmaking logic 504 can be configured to perform matching of players based on their skills or tendencies in gameplay, as indicated at reference 510. For example, in some implementations players that exhibit similar styles or tendencies can be matched together on the same team. In other implementations, players can be assigned to various teams based on their skills so that teams are formed with a variety of skills. That is, if possible players with similar skill sets are assigned to different teams so that each team will have a variety player types. In some implementations, players are matched with each other based on their skill sets or tendencies being complementary. For example, given a group of possible skills in a video game, players may be matched with each other as part of a team in a manner that maximizes the total skills of the team overall.

Considering opposing matchups, in some implementations, players with different skill sets or styles are matched together as opponents to provide for more interesting gameplay. Conversely, players with similar skill sets may not be matched against each other if possible.

In some implementations, matchmaking logic 504 is configured to perform player role filling, as indicated that reference 512, based on evaluations of the players' machine learning models. That is, in a video game there may be various roles to which a player can be assigned. In this context, a given user's machine learning model can be evaluated in terms of how well it performs at fulfilling a specific role. Based on this, the matchmaking logic 504 can determine the best players to fill various roles, for example on a team.

Additionally, in some implementations the matchmaking logic can perform matchmaking for AI bots, as indicated at reference 514. It will be appreciated that any of the above described matchmaking functions which are applied to users, can also be applied to corresponding AI bots which can be inserted into a video game as has been described. For example, AI bots can be evaluated and placed or assigned based on their level compatibility, skill set, ability to fulfill a given role, etc.

For example, a team of players may be in need of an additional player, and the system may determine the best AI bot to join the team, e.g. from a given set of available AI bots, such as from corresponding users who are connected to one or more of the team members in a social graph. In some implementations, the matchmaking logic may perform a player or AI bot search, for example by determining who is available, and who is qualified to fulfill a certain role. By way of example without limitation, one may seek a defensive player or AI bot, and thus the system will evaluate the defensive capabilities of the available trained machine learning models, by presenting them with defensive scenarios and determining how they react, and then choose the player or AI bot based on the results.

In some implementations, evaluation/classification of machine learning models can be carried out not just on an individual basis, but in combination. Different groupings of players can be evaluated by evaluating combinations of trained machine learning models together. For example, to evaluate the performance of a group of players as a team, their machine learning models or AI bots can be presented with one or more group scenarios in which they simultaneously participate, and the outcomes can be evaluated. In some implementations, this can entail execution of a functional game engine component so that the effects of actions taken by the models which may in turn affect each other's subsequent actions or decisions can be simulated. In related implementations, the performance of a group of players against one another can also be evaluated by applying the players trained models to the same group scenario, and determining how each of the players performed within the group scenario.

It will be appreciated that a user's machine learning model or AI bot can be continually updated over time, and will therefore change over time. Thus, in some implementations, in order to provide current evaluation/classification for matchmaking, the machine learning model can be evaluated at the time of the matchmaking request (e.g. when the user requests to play a multiplayer video game). In this manner, a dynamic matchmaking process is enabled, for which up-to-date classifications are used.

Figure 6:
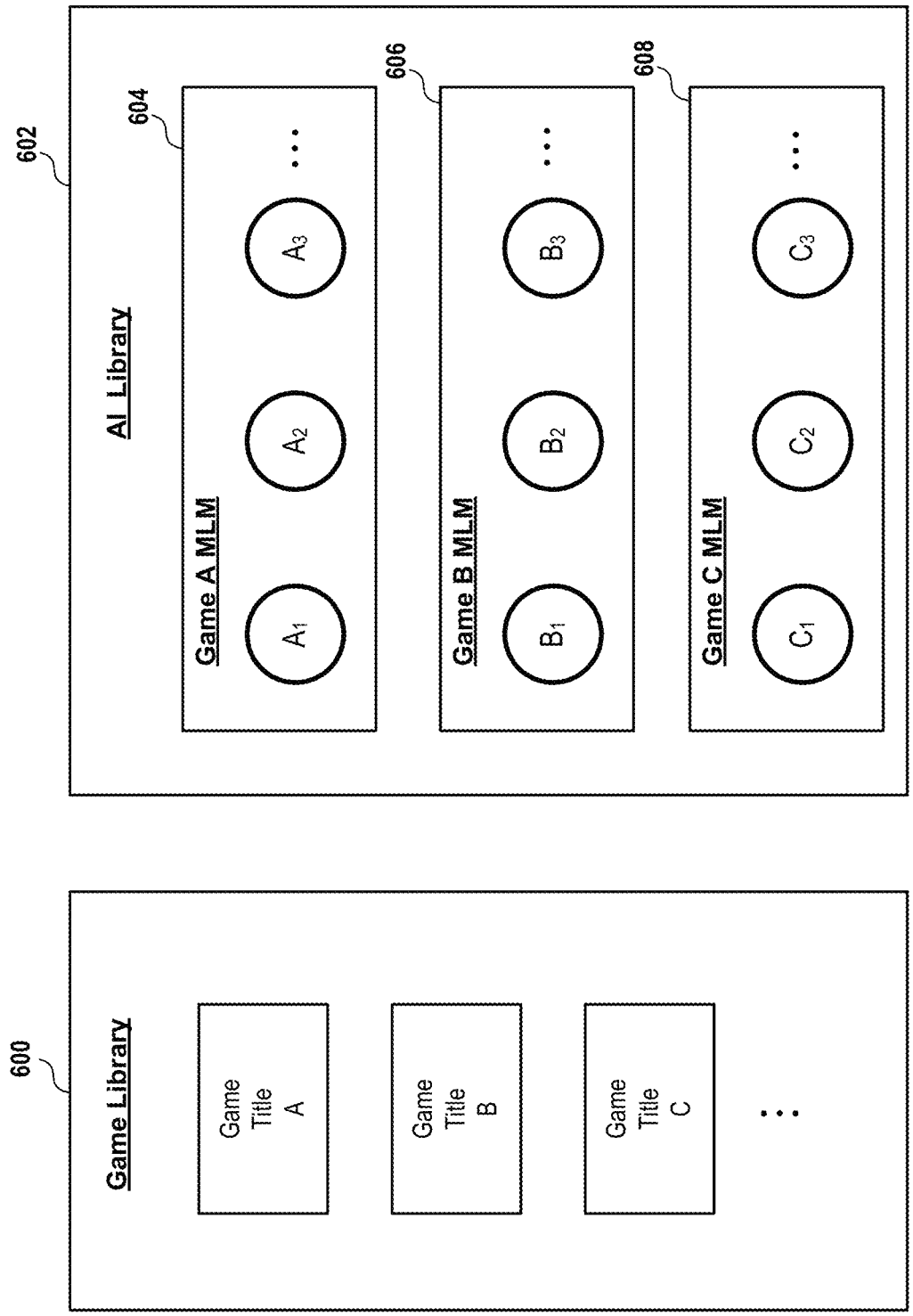
FIG. 6 conceptually illustrates libraries of a user account that provide for multiple machine learning models for a given user, in accordance with implementations of the disclosure.

FIG. 6 conceptually illustrates libraries of a user account that provide for multiple machine learning models for a given user, in accordance with implementations of the disclosure. As shown, a user account may have a game library 600 consisting of various game titles that the user owns or to which the user has access, such as game title A, game title B, and game title C in the illustrated implementation. The user account further includes an AI library 602 which includes various machine learning models for each of the game titles in the game library 600. A set of machine learning models for game title A is shown at reference 604, including the machine learning models $A_1$, $A_2$, and $A_3$. Likewise sets of machine learning models for game titles B and C are shown at references 606 and 608, respectively, including machine learning models $B_1$, $B_2$, and $B_3$ for game title B, and machine learning models $C_1$, $C_2$, and $C_3$ for game title C.

It will be appreciated that for a given game title, the user may possess one or more machine learning models which have been trained to imitate the user's gameplay. For example, as a user plays a given video game, their machine learning model will evolve, and various states of the machine learning model can be captured and saved. Thus, multiple machine learning models can capture different versions of the player over time and serve as snapshots of the capabilities of the user for that video game at different times. Generally speaking, it is expected that as a user continues to play a given video game, their level of skill will increase. In some implementations it can be useful to be able to obtain a prior machine learning model that is indicative of the user's abilities at a previous time (and lower level of skill) than at a current time. For example, a friend who is at a lower skill level may wish to play against the user, who is presently at a higher skill level. Therefore, to provide a competitive gameplay experience for the friend, a previous machine learning model of the user having a skill level similar to that of the friend can be deployed on behalf of the user.

In other implementations, a user may have multiple machine learning models for a given video game corresponding to various purposes within the context of the video game, such as playing as different characters, playing in different roles, pursuing different advancement or development paths, etc.

It will be appreciated that classification scenarios are configured or chosen to be useful for ascertaining characteristics of the user's machine learning model. In order to determine what types of scenarios or portions of a video game will be useful for classification purposes, it can be useful to analyze user gameplay and game scenes to determine what aspects of gameplay are good indicators to enable robust classification. For example, gameplay of users may be analyzed to determine the types of actions that make a player statistically more likely to win or lose. Then scenarios that highlight the use of such actions can be created for classification purposes. Or in another example, gameplay of various scenes of a video game can be analyzed to determine which scenes are good indicators of user skill or success, e.g. users that pass a certain scene or take a certain action in a particular scene are more likely to win.

Implementations of the present disclosure can be included as part of a game engine. Broadly speaking, a game engine is a software-development framework providing features that enable efficient development of video games. A game engine can include a software library with reusable modules to handle various aspects of game functionality, including by way of example without limitation, graphics rendering (e.g. including vertex processing, polygon processing, shading, lighting, texturing, etc.), sound, physics (including collision handling), animation, scripting, artificial intelligence, networking, streaming, memory management, threading, localization support, scene graph, cinematics, etc.

Game engines can be optimized for different hardware platforms, such as game consoles, mobile devices, personal computers, etc. By way of example without limitation, a game engine may optimize memory use depending upon the platform (e.g. how to prioritize various tasks in the graphics pipeline, etc.). In some implementations, the hardware may be a bladed version of some specific processing entity, such as a game console. Thus, a user may be assigned to a specific blade, which gives the same hardware that a console game has been optimized for.

It will be appreciated that there can also be game server logic to provide streaming and/or other services (packetizing, encoding, quality of service (QOS) monitoring, bandwidth testing, access to social network/friends, etc.)

In some implementations, a cloud infrastructure may run a hypervisor, which abstracts the hardware and provides a virtual machine framework, upon which an operating system (OS) can be loaded. Thus, a stack may include the application/video game, running on an OS, which is loaded on a virtual machine (VM) instantiated by the hypervisor, which is loaded on underlying hardware. In this manner, the execution of the application is not necessarily coupled to specific hardware.

In some implementations, an application/video game may execute over a container, which abstracts at the application layer, packaging code and dependencies together, thus enabling software development agnostic of OS or hardware platform, and facilitating software portability across platforms.

In some implementations, a distributed game engine is employed wherein different parts of the game engine can be can be handled by different compute entities. For example, the functionality of the game engine such as physics engine, rendering engine (2D/3D graphics), sound, scripting, animation, AI, networking, streaming (encoding), memory management, threading, etc. can be divided into different functional processing blocks and/or services that are distributed among many different computes. It will be appreciated that for a distributed game engine, low-latency communication is required to avoid latency issues. To maintain desired frame rates, total time of computes and communication should meet certain constraints. Thus, it may or may not be efficient to divide certain tasks depending upon whether it is possible to complete the process in shorter time.

An advantage of using a distributed game engine is that it is possible to take advantage of elastic computing, wherein computing resources can be scaled up or down depending upon needs. For example, in a large multiplayer game executed traditionally on a single hardware server, after for example about 100 players, hardware resources become limited, so that more players cannot be added. The game may queue additional players, meaning that players must wait to join the game. However, with a distributed game engine, by using elastic cloud computing resources, more compute nodes can be added to meet demand, thus enabling for example thousands of players. The game is no longer constrained by the limits of a particular hardware server.

Thus, a cloud game engine can have functionality distributed to different processing entities. It will be appreciated that different functions can be executed in different frameworks. For example, some functions (e.g. social) might be easier to run in a container, whereas graphics might be better run using a VM connected to a GPU.

To facilitate distribution of the functionality of a cloud game engine, a distribution/synchronization layer can manage distribution of jobs, e.g. sending jobs out, receiving data back, identifying what tasks are performed and when, handling queueing e.g. if a job is finished faster than needed. In some implementations a given task could be dynamically subdivided if needed. For example, animation could have lighting, and if the lighting is especially complex, the lighting could be subdivided into three lighting jobs that are sent out for computing and reassembled upon return. Thus game engine functions can be subdivided if they require more work.

Cloud service providers provide computes at specified performance levels, for example in input/output operations per second ("IOPS"). Thus, a gaming provider may specify VMs, dedicated processing power, amount of memory, etc. from a cloud service provider and instantiate a distributed cloud gaming engine using the cloud service provider's systems.

In some implementations the library module and update handler can be one or more components or modules of a game engine. In some implementations, the library module and update handler can be separate components, or integrated. In some implementations the library module and update handler may operate as an addition to a game engine. In some implementations the game engine can be a distributed game engine, as noted above.

As noted, implementations of the disclosure can be applied to cloud gaming systems. One example of a cloud gaming system is the Playstation® Now cloud gaming system. In such a system, the client device can be a game console, such as a Playstation® 4 game console, or may be another device such as a personal computer, laptop, tablet, cell phone, mobile device, etc.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, and other user-related data that may require uploading of additional game content. In some embodiments, game content is made available by streaming the game content from the game cloud system to a user's computing device for viewing and interacting. In some implementations, after loading user specific data, the game content is available for game play.

Figure 7A:
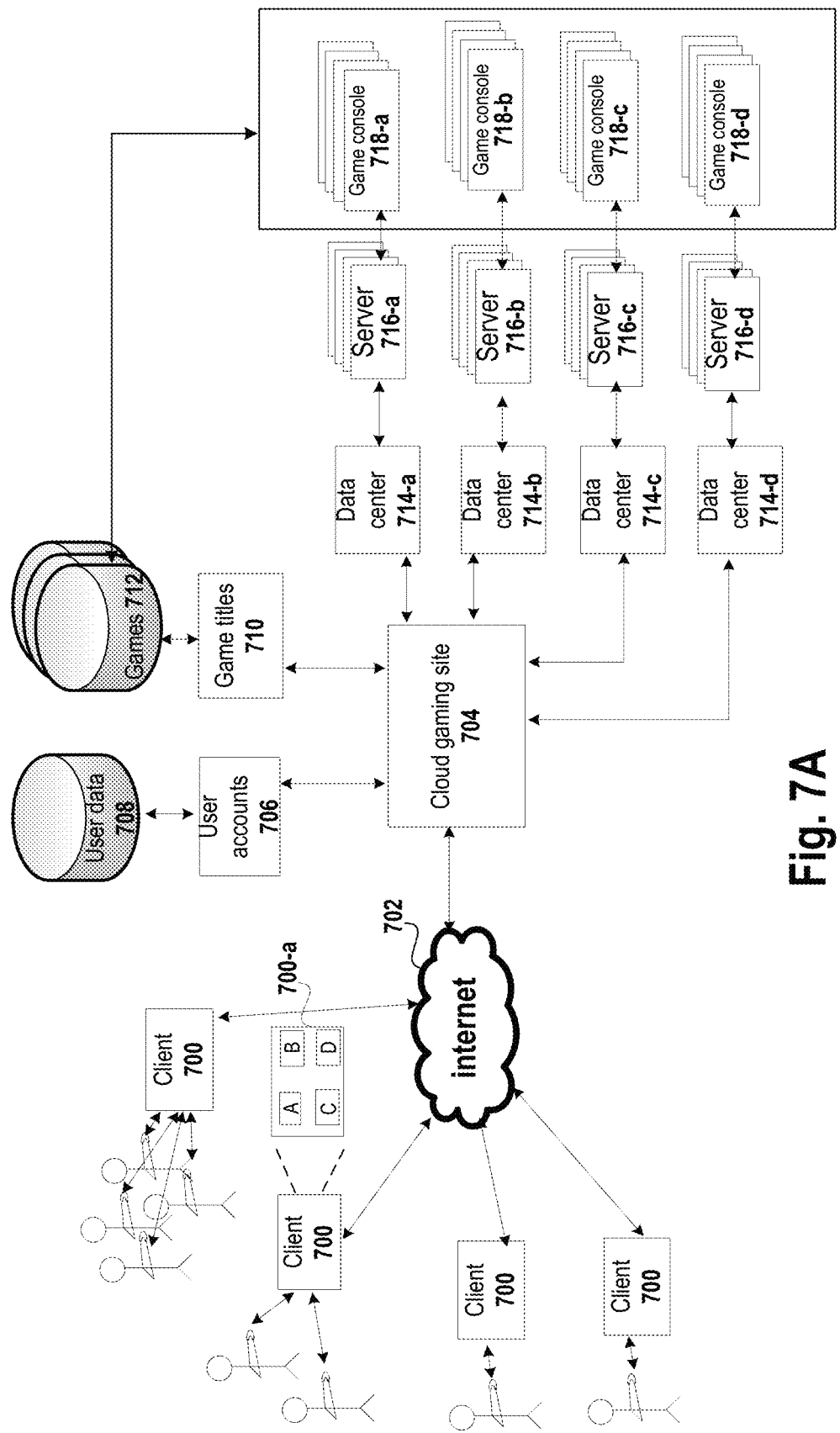
FIG. 7A illustrates an exemplary system used to load game files for a game available through a cloud gaming site, in accordance with implementations of the disclosure.

FIG. 7A illustrates an exemplary system used to load game files for a game available through a cloud gaming site. The system includes a plurality of client devices 700 that are communicatively connected to the cloud gaming site 704 over a network 702, which can include a LAN, wired, wireless, cellular (e.g. 4G, 5G, etc.), or any other type of data network, including the Internet. When a request to access the cloud gaming site 704 is received from a client device 700, the cloud gaming site 704 accesses user account information 706 stored in a user data store 708 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 710 to identify the game titles that are available at the game cloud site for the user account initiating the request. The game titles data store 710, in turn, interacts with a games database 712 to obtain the game titles for all the games that are available for the cloud gaming site. As new games are introduced, the games database 712 will be updated with the game code and the game titles data store 710 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 700-*a*, as shown in FIG. 7A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 7B:
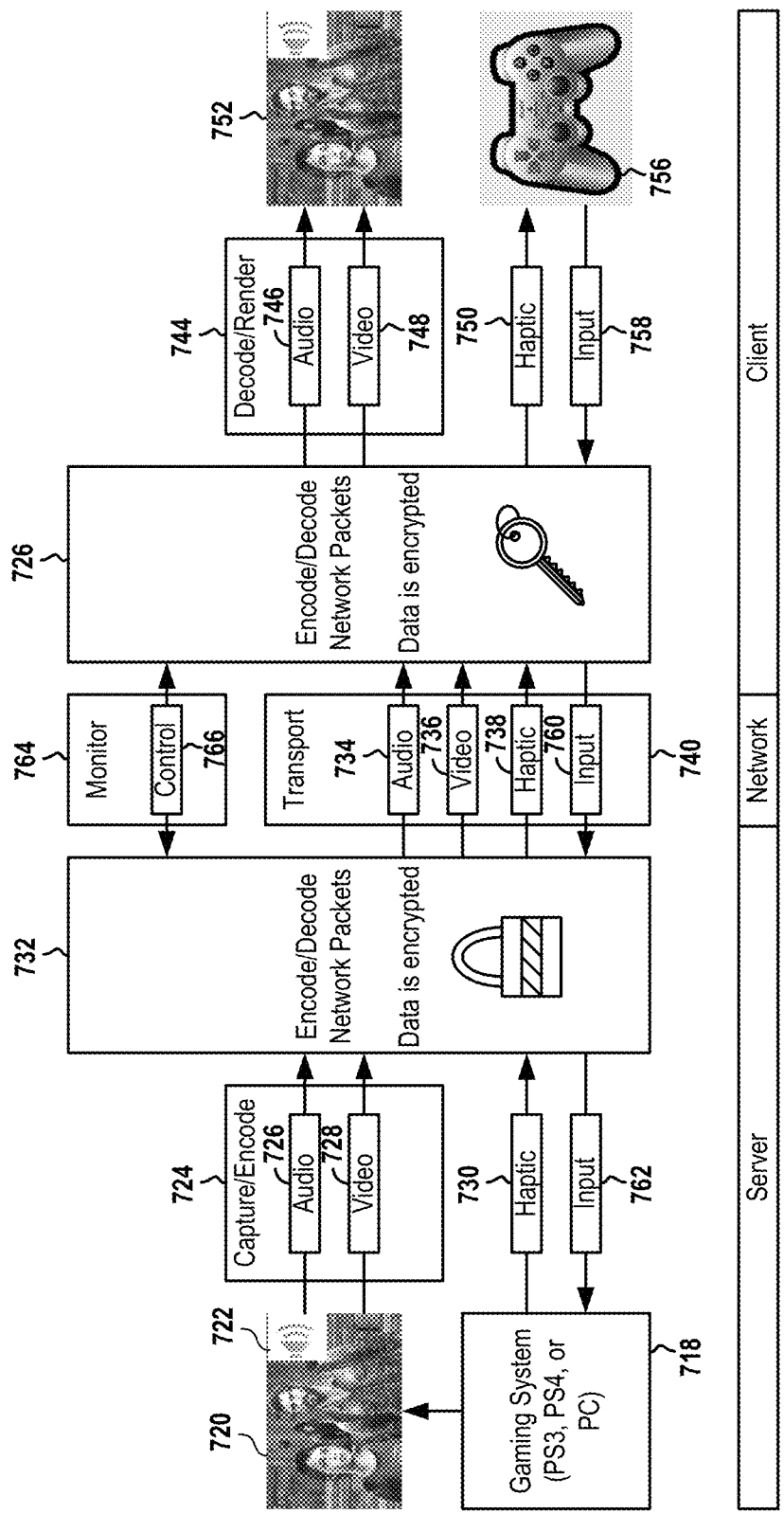
FIG. 7B is a flow diagram conceptually illustrating various operations which are performed for streaming a cloud video game to a client device, in accordance with implementations of the disclosure.

FIG. 7B is a flow diagram conceptually illustrating various operations which are performed for streaming a cloud video game to a client device, in accordance with implementations of the disclosure. The gaming system 718 executes a video game and generates raw (uncompressed) video 720 and audio 722. The video 720 and audio 722 are captured and encoded for streaming purposes, as indicated at reference 724 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 726 and encoded video 728 are further packetized into network packets, as indicated at reference numeral 732, for purposes of transmission over a network such as the Internet. The network packet encoding process can also employ a data encryption process, thereby providing enhanced data security. In the illustrated implementation, audio packets 734 and video packets 736 are generated for transport over the network, as indicated at reference 740.

The gaming system 718 additionally generates haptic feedback data 730, which is also packetized into network packets for network transmission. In the illustrated implementation, haptic feedback packets 738 are generated for transport over the network, as further indicated at reference 740.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 740, the audio, video, and haptic feedback packets are transported over a network, such as and/or including the Internet. As indicated at reference 742, the audio packets 734, video packets 736, and haptic feedback packets 738, are decoded/reassembled by the client device to define encoded audio 746, encoded video 748, and haptic feedback data 750 at the client device. If the data has been encrypted, then the network packets are also decrypted. The encoded audio 746 and encoded video 748 are then decoded by the client device, as indicated at reference 744, to generate client-side raw audio and video data for rendering on a display device 752. The haptic feedback data 750 can be processed/communicated to produce a haptic feedback effect at a controller device 756 or other interface device through which haptic effects can be rendered. One example of a haptic effect is a vibration or rumble of the controller device 756.

It will be appreciated that a video game is responsive to user inputs, and thus, a similar procedural flow to that described above for transmission and processing of user input, but in the reverse direction from client device to server, can be performed. As shown, a user operating controller device 756 may generate input data 758. This input data 758 is packetized at the client device for transport over the network to the cloud gaming system. The input data packets 760 are unpacked and reassembled by the cloud gaming server to define input data 762 on the server-side. The input data 762 is fed to the gaming system 718, which processes the input data 762 to update the game state of the video game.

During transport (ref. 740) of the audio packets 734, video packets 736, and haptic feedback packets 738, the transmission of data over the network can be monitored to ensure the cloud game stream quality of service. For example, network conditions can be monitored as indicated by reference 764, including both upstream and downstream network bandwidth, and the game streaming can be adjusted in response to changes in available bandwidth. That is, the encoding and decoding of network packets can be controlled based on present network conditions, as indicated by reference 766.

Figure 8:
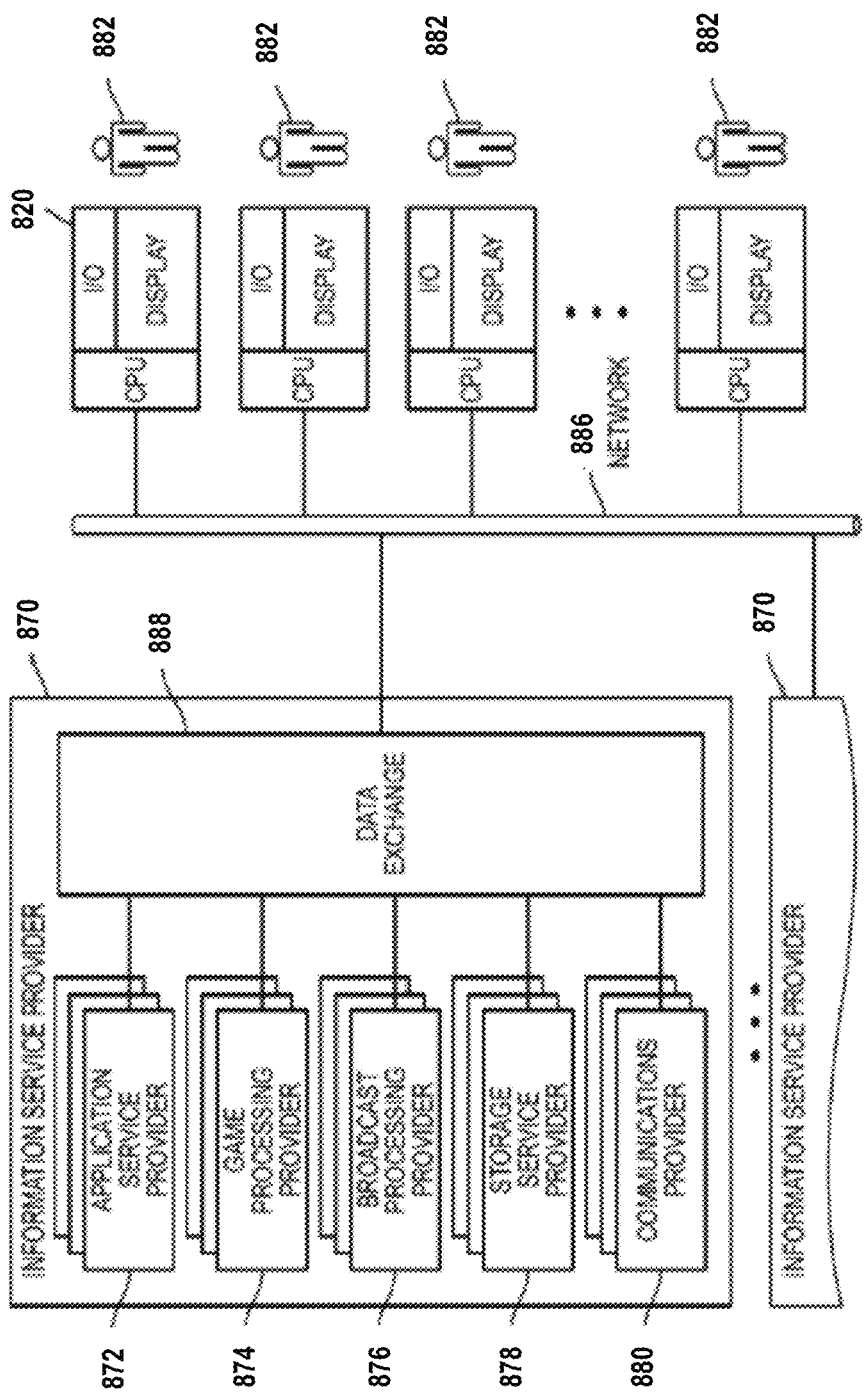
FIG. 8 illustrates an embodiment of an Information Service Provider architecture, in accordance with implementations of the disclosure.

FIG. 8 illustrates an embodiment of an Information Service Provider architecture. Information Service Providers (ISP) 870 delivers a multitude of information services to users 882 geographically dispersed and connected via network 886. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 870 includes Application Service Provider (ASP) 872, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 870 includes a Game Processing Server (GPS) 874 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 876 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 878 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 880 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 888 interconnects the several modules inside ISP 870 and connects these modules to users 882 via network 886. Data Exchange 888 can cover a small area where all the modules of ISP 870 are in close proximity, or can cover a large geographic area when the different modules are geographically dispersed. For example, Data Exchange 888 can include a fast Gigabit Ethernet (or faster) within a cabinet of a data center, or an intercontinental virtual area network (VLAN).

Users 882 access the remote services with client device 884, which includes at least a CPU, a memory, a display and I/O. The client device can be a PC, a mobile phone, a netbook, tablet, gaming system, a PDA, etc. In one embodiment, ISP 870 recognizes the type of device used by the client and adjusts the communication method employed. In other cases, client devices use a standard communications method, such as html, to access ISP 870.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A method, comprising:
    recording gameplay data from a first session of a video game, the first session defined for interactive gameplay of a user;
    training a machine learning model using the gameplay data, wherein the training causes the machine learning model to imitate the interactive gameplay of the user;
    after the training, determining a classification of the machine learning model by exposing the machine learning model to one or more scenarios of the video game, and evaluating actions of the machine learning model in response to the one or more scenarios;
    using the classification of the machine learning model to assign the user to a second session of the video game, the second session defined for control of interactive gameplay by the user, the control of interactive gameplay including controlling in-game actions of a character or entity by the user during the second session.

2. The method of claim 1, wherein the gameplay data includes video of the first session and user inputs during the interactive gameplay.

3. The method of claim 2, wherein training the machine learning model uses the video and the user inputs to cause the machine learning model to respond to a given portion of the video by generating inputs similar to the user inputs that were generated in response to the given portion of the video during the first session.

4. The method of claim 3, wherein the given portion of the video is defined by one or more image frames of the video.

5. The method of claim 2, wherein the user inputs are defined from a controller device operated by the user during the first session.

6. The method of claim 1, wherein the machine learning model is a neural network.

7. The method of claim 1, wherein the one or more scenarios of the video game are defined by one or more image frames of the video game, that are not defined from the first session.

8. The method of claim 1, wherein the gameplay data includes game state data from the first session of the video game.

9. The method of claim 1,
    wherein the classification identifies a level of skill of the user; and
    wherein using the classification to assign the user to the second session includes, identifying levels of skill of one or more other users, and configuring the second session to include one or more of the other users having levels of skill that are similar to the level of skill of the user.

10. The method of claim 1,
    wherein the classification identifies a skillset of the user; and
    wherein using the classification to assign the user to the second session includes, identifying skillsets of one or more other users, and configuring the second session to include one or more of the other users having skillsets that are complementary to the skillset of the user.

11. The method of claim 1, wherein assigning the user to the second session of the video game includes, inserting an AI bot into the second session, the AI bot using the trained machine learning model to perform gameplay in the second session.

12. A method, comprising:
    recording gameplay data from user sessions of a video game, the user sessions defined for interactive gameplay of the video game by a user;
    using the gameplay data to train a machine learning model to mimic tendencies of the user in the interactive gameplay;

after the training, performing an evaluation of the trained machine learning model by exposing the trained machine learning model to predefined scenarios of the video game, and analyzing responses to the predefined scenarios by the trained machine learning model;

using the evaluation of the machine learning model to assign the user to a new session of the video game, the new session defined for control of interactive gameplay by the user, the control of interactive gameplay including controlling in-game actions of a character or entity by the user during the second session.

13. The method of claim 12, wherein the gameplay data includes video and user inputs from the user sessions of the video game.

14. The method of claim 12, wherein the tendencies of the user in the interactive gameplay are defined by activity and non-activity of the user in the interactive gameplay.

15. The method of claim 12, wherein performing the evaluation of the trained machine learning model is configured to determine a skill level of the user, and wherein assigning the user to the new session is based on the determined skill level of the user.

16. The method of claim 12, wherein performing the evaluation of the trained machine learning model is configured to determine a skill set of the user, and wherein assigning the user to the new session is based on the determined skill set of the user.

17. The method of claim 12, wherein the machine learning model is a neural network.

* * * * *